United States Patent
Kirstein

(10) Patent No.: US 11,922,701 B2
(45) Date of Patent: Mar. 5, 2024

(54) METHOD AND SYSTEM FOR CREATING A SEMANTIC REPRESENTATION OF THE ENVIRONMENT OF A VEHICLE

(71) Applicant: Continental Automotive GmbH, Hannover (DE)

(72) Inventor: Stephan Kirstein, Rodgau (DE)

(73) Assignee: Continental Automotive GmbH (DE)

( * ) Notice: Subject to any disclaimer, the term of this patent is extended or adjusted under 35 U.S.C. 154(b) by 481 days.

(21) Appl. No.: 17/147,951

(22) Filed: Jan. 13, 2021

(65) Prior Publication Data

US 2021/0295062 A1 Sep. 23, 2021

(30) Foreign Application Priority Data

Mar. 19, 2020 (DE) ...................... 10 2020 203 543.1

(51) Int. Cl.
*G06V 20/58* (2022.01)
*B60W 30/095* (2012.01)

(52) U.S. Cl.
CPC ......... *G06V 20/58* (2022.01); *B60W 30/0953* (2013.01); *B60W 30/0956* (2013.01); *G06V 20/586* (2022.01); *B60W 2420/42* (2013.01); *B60W 2554/4041* (2020.02)

(58) Field of Classification Search
None
See application file for complete search history.

(56) References Cited

U.S. PATENT DOCUMENTS

| | | | |
|---|---|---|---|
| 10,366,508 B1 * | 7/2019 | Liu | G06T 5/006 |
| 10,410,328 B1 * | 9/2019 | Liu | G05D 1/0274 |
| 11,644,834 B2 * | 5/2023 | Ditty | G06F 15/7807 |
| | | | 701/23 |
| 2018/0300560 A1 * | 10/2018 | Westerhoff | G06N 7/00 |
| 2019/0212749 A1 * | 7/2019 | Chen | G06N 20/00 |
| 2019/0258251 A1 * | 8/2019 | Ditty | B60W 50/023 |

(Continued)

FOREIGN PATENT DOCUMENTS

| | | |
|---|---|---|
| DE | 102013217488 | 3/2015 |
| DE | 102016224212 | 6/2018 |
| DE | 102019001956 | 2/2020 |

OTHER PUBLICATIONS

German Examiner Stefan Bahr, German Search Report for German Patent Application No. 10 2020 203 543.1, dated Nov. 18, 2020, 5 pages, German Patent and Trademark Office, Muenchen, Germany, with English partial translation, 5 pages.

*Primary Examiner* — Soo Shin

(74) *Attorney, Agent, or Firm* — Buchanan, Ingersoll & Rooney, PC

(57) ABSTRACT

The invention relates to a method for creating a semantic representation of the environment of a vehicle, having the following steps:
acquiring (S1) sensor measuring data by means of at least one first (2a) and/or second environment detection sensor (2b) of the vehicle,
detecting (S2) objects and free spaces in the environment of the vehicle,
creating (S3) a grid map having occupied and free grid cells based on the detected objects and free spaces;
determining (S4) height information by means of the at least one first (2a) and/or second environment detection sensor (2b);
adding (S5) the height information to each grid cell;
allocating (S6) semantic information to the grid cells based on the height information.

5 Claims, 1 Drawing Sheet

(56) References Cited

U.S. PATENT DOCUMENTS

| | | | |
|---|---|---|---|
| 2019/0384302 A1* | 12/2019 | Silva | G06T 7/10 |
| 2021/0295062 A1* | 9/2021 | Kirstein | G06V 20/56 |
| 2021/0302992 A1* | 9/2021 | Chen | B60W 60/0027 |
| 2021/0334556 A1* | 10/2021 | Vignard | G06V 20/58 |

* cited by examiner

METHOD AND SYSTEM FOR CREATING A SEMANTIC REPRESENTATION OF THE ENVIRONMENT OF A VEHICLE

The invention relates to a method and a system for creating a semantic representation of the environment of a vehicle.

Dempster-Shafer theory (DST) grid maps are, for example, known from the prior art. Such grid maps are useful for the creation of static environment representations. Said grid maps illustrate regions in the environment of the vehicle which can probabilistically be driven through.

It is an object of the present invention to provide an improved environment representation.

This object is achieved by the subject-matter of the independent claims 1 and 5. Further advantageous configurations and embodiments are the subject-matter of the subclaims.

Initial considerations concerned the fact that extensions to a DST grid map, which assign a height value to each cell, do indeed already exist, nevertheless it is difficult to select the height value in the case of large and elevated objects. Furthermore, DST grid maps are pure 2D representations and are therefore only able to depict objects which can be driven under very poorly, since they delimit the general free space. There is additionally no further subdivision of the static obstacles into semantic categories such as can be partially driven over (e.g. curbstone) or can be driven under. In particular, objects which can be driven under (e.g. bridges or roof structures) or large lampposts constitute a good source of localization features. The invention extends the DST grid maps by different layers, the representation interval of which is established by their semantic meaning.

According to the invention, a method for creating a semantic representation of the environment of a vehicle is accordingly proposed, having the following steps:
  acquiring sensor measuring data by means of at least one first and/or second environment detection sensor of the vehicle,
  detecting objects and free spaces in the environment of the vehicle,
  creating a grid map having occupied and free grid cells based on the detected objects and free spaces;
  determining height information by means of the at least one first and/or second environment detection sensor;
  adding the height information to each grid cell;
  allocating semantic information to the grid cells based on the height information.

The environment detection sensors are preferably a mono camera, a stereo camera, a radar sensor, a lidar sensor or an ultrasonic sensor. One of the two sensors is preferably a camera, in particular a stereo camera. This is particularly advantageous, since height information can be detected with a stereo camera. The use of two different sensor types is advantageous, since not every sensor can distinguish all semantic classes. Therefore, a sensor data fusion is advantageous. Accordingly, the sensor measuring data are a camera image, a sequence of camera images, a point cloud, and radar or ultrasonic reflections. Depending on the condition of the surroundings, height information can be understood to be a positive or negative value or the value 0. If the height information equals 0, an explicit free space exists. In the case of a negative value of the height information, it is possible that a pothole, for example, has been detected. Depending on the size of the value, a positive value can denote an obstacle or an object which can potentially be driven over. Said height information is allocated to each grid cell and, subsequently, corresponding semantic information is allocated based on the height information values.

In a preferred embodiment, the semantic information is selected from "negative height", "explicit free space", "can be driven over conditionally", "obstacle", or "object can potentially be driven under". Negative height can, for example, be understood to be trenches or potholes. In current environment representations, such negative heights either appear as unknown or, in the worst case, as a free space. "Explicit free space" is understood to be the representation of the directly measured free space. Frequently, the system only operates with implicit free space, since the sensor does not supply any height information. This is based on the assumption that there is a free space between the sensor and the closest obstacle. This assumption is not sustainable in borderline cases. Low obstacles which are not normally to be driven over, but which can be driven on in special situations such as parking, avoiding maneuvers or in an emergency, at least at low speeds, are classified as "can be driven over conditionally". This can, for example, be curbstones which, it is true, are not normally driven over, but can admittedly be driven over during parking. In the light of the invention, obstacles are neither static objects which can be driven over nor driven under. This category corresponds in the broadest sense to the usual obstacle representation of DST grid maps. Objects which can be potentially driven under can denote two types of objects. On the one hand, objects which can potentially be driven under can become objects which can actually be driven under, if the objects only appear in this category. If, in addition, the objects are also present in the obstacle category, these are objects having a great height such as, for example, a lamppost and can be used for self-localization.

The different semantic information can be stored as a look-up table in a data processing device and can thus be quickly called up and allocated depending on height information.

In a further preferred embodiment, the grid map is extended by corresponding layers based on the different semantic information. Each of these items of semantic information consequently fixes a layer. An important item of semantic information is the height above ground level, but further information such as the flexibility or pliability (e.g. in the case of vegetation or balls) is also conceivable. Moreover, measuring points can be situated close to the respective layer boundaries of two semantic categories. In order to minimize errors caused by measurement noise, an extension of the sensor model is proposed, which also interpolates beyond the limits of the semantic layer. Depending on the type of sensor, this can vary from a simple linear or bilinear interpolation right up to complex distributions (e.g. a Gaussian distribution). The important thing here is that the weights which modify the DST grid cells together or in total produce the original existence probability, that is to say are only distributed.

A measuring point at a height of 1.90 m was, for example, determined. This measuring point would, in this example, be allocated to the "obstacle" category, since the category "object can potentially be driven under" would only be allocated as of 2 m. In such a case, it is advisable to divide the existence probability of this measuring point up into both categories, based on the distance from the layer boundary. The closer it is to the boundary, the more likely the measuring point will be allocated 50:50 to the two layers in the simplest case.

Furthermore, these layers are advantageous in order to fix the implicit free space. The basic idea behind an implicit free space is that if something can be measured, then the point-to-point line of sight between the sensor and the measuring point is probably free. As a general rule, this is utilized in the case of DST grids, in order to depict the transition between free/occupied as precisely as possible. As proposed in this embodiment, the implicit free space now exists in different layers in that the free space category is projected. This is only carried out if none of the other layers, apart from the layers for can be driven under and negative height, indicates an obstacle. In this way, the free space information, particularly along obstacles, can be depicted much more precisely. Depending on which layers are being considered, various free space regions, viewed semantically, are also created such as free of obstacles (considers curbstones and obstacles) or free in the sense of can be driven over conditionally (curbstones are deemed to be potentially free).

In a further preferred embodiment, a driving function is adapted based on the allocated semantic information. For example, the vehicle speed can be reduced when a pothole is recognized or, depending on the size, an avoiding trajectory can also be planned. The allocated semantic information is further preferably used for self-localization. This is in particular possible, as already described, in the case of objects which can potentially be driven under, which are additionally classified as obstacles (e.g. a street lamp).

A system for creating a semantic representation of the environment of a vehicle is further proposed according to the invention, comprising at least one first and/or second environment detection sensor for acquiring sensor measuring data and a data processing device, wherein the data processing device is configured to analyze the acquired sensor measuring data and to detect objects and free spaces,
to create a grid map having grid cells based on the detected objects and free spaces,
to determine height information from the sensor data of the first and/or second environment detection sensor,
to add the height information to the grid cells, and
to allocate semantic information to the grid cells based on the height information.

Further advantageous configurations are set out by the drawings, wherein.

Figure 1:
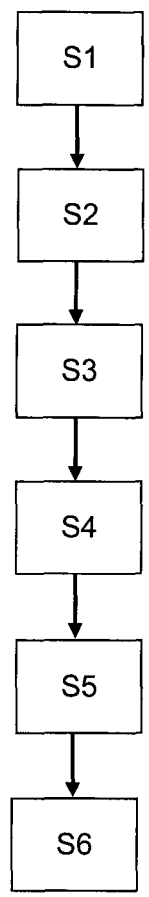
FIG. 1 shows a schematic flow chart of an embodiment of the invention.

FIG. 1 shows a schematic flow chart of an embodiment of the invention. Sensor measuring data are acquired by means of at least one first 2a and/or second environment detection sensor 2b of the vehicle in step S1. Objects and free spaces are detected in the environment of the vehicle based on the data of the environment detection sensors in step S2. In a next step S3, a grid map having occupied and free grid cells is created based on the detected objects and free spaces. In a step S4, height information is determined by means of the at least one first 2a and/or second environment detection sensor 2b. In step S5, said determined height information is added to each grid cell. Finally, semantic information is allocated to the grid cells based on the height information in step S6.

Figure 2:
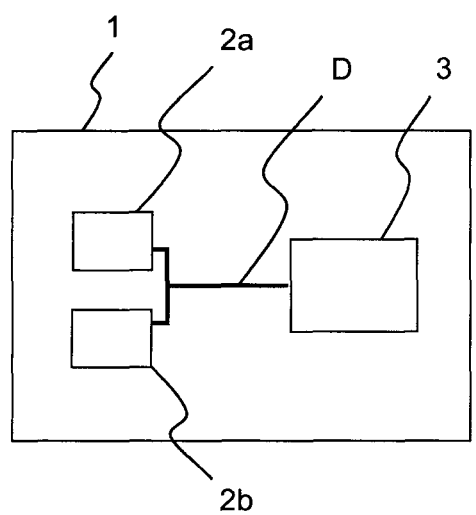
FIG. 2 shows a schematic representation of a system according to an embodiment of the invention.

A schematic representation of a system 1 according to an embodiment of the invention is shown in FIG. 2. The system 1 comprises a first 2a and a second environment detection sensor 2b. Furthermore, a data processing device 3 is shown, which analyzes and evaluates the images or sequences of images of the environment detection sensors 2a, 2b and, based on said information, creates a grid map. The environment detection sensors 2a, 2b are connected by way of a data link D to the data processing device 3. The data link D can be configured to be wired or wireless, e.g. WLAN, Bluetooth or similar.

LIST OF REFERENCE NUMERALS

1 System
2a First environment detection sensor
2b Second environment detection sensor
3 Data processing device
D Data link
S1-S6 Method steps

The invention claimed is:

1. A method for creating a semantic representation of the environment of a vehicle, the method comprising:
   acquiring sensor measuring data by at least one first and/or second environment detection sensor of the vehicle,
   detecting objects and free spaces in the environment of the vehicle,
   creating a grid map having occupied and free grid cells based on the detected objects and free spaces;
   determining height information of the detected objects and free spaces by the at least one first and/or second environment detection sensor;
   adding the height information of the detected objects and free spaces to each grid cell; and
   allocating semantic information to the grid cells based on the height information of the detected objects and free spaces,
   wherein the semantic information is selected from negative height, free space, a detected object that can be driven over conditionally, and/or the detected object that can be driven under, and
   wherein the grid map is extended by corresponding layers based on the semantic information.

2. The method according to claim 1, wherein a driving function is adapted based on the allocated semantic information.

3. The method according to claim 1, wherein the allocated semantic information is used for self-localization.

4. The method according to claim 1, wherein the semantic information further includes a directly measured free space.

5. A system for creating a semantic representation of the environment of a vehicle, the system comprising at least one first and/or second environment detection sensor for acquiring sensor measuring data and a data processing device, wherein the data processing device is configured to:
   analyze the acquired sensor measuring data and to detect objects and free spaces,
   create a grid map having grid cells based on the detected objects and free spaces,
   determine height information of the detected objects and free spaces from the sensor data of the first and/or second environment detection sensor,
   add the height information of the detected objects and free spaces to the grid cells, and
   allocate semantic information to the grid cells based on the height information of the detected objects and free spaces,
   wherein the semantic information is selected from negative height, free space, a detected object that can be driven over conditionally, and/or the detected object that can be driven under, and wherein the grid map is extended by corresponding layers based on the semantic information.

* * * * *